United States Patent
Hiernaux

(10) Patent No.: US 10,690,147 B2
(45) Date of Patent: Jun. 23, 2020

(54) COMPRESSOR WITH SEGMENTED INNER SHROUD FOR AN AXIAL TURBINE ENGINE

(71) Applicant: Safran Aero Boosters SA, Herstal (Milmort) (BE)

(72) Inventor: Stephane Hiernaux, Oupeye (BE)

(73) Assignee: SAFRAN AERO BOOSTERS SA (BE)

( * ) Notice: Subject to any disclaimer, the term of this patent is extended or adjusted under 35 U.S.C. 154(b) by 270 days.

(21) Appl. No.: 15/872,242

(22) Filed: Jan. 16, 2018

(65) Prior Publication Data

US 2018/0209304 A1    Jul. 26, 2018

(30) Foreign Application Priority Data

Jan. 26, 2017   (BE) .................................. 2017/5049

(51) Int. Cl.
*F04D 29/58* (2006.01)
*F01D 25/24* (2006.01)
(Continued)

(52) U.S. Cl.
CPC .......... *F04D 29/584* (2013.01); *F01D 5/143* (2013.01); *F01D 9/04* (2013.01); *F01D 9/041* (2013.01);
(Continued)

(58) Field of Classification Search
None
See application file for complete search history.

(56) References Cited

U.S. PATENT DOCUMENTS

| 6,990,797 B2 * | 1/2006 | Venkataramani ....... F02C 7/047 244/134 R |
| 8,015,788 B2 * | 9/2011 | Stephenson ............. F01D 5/046 415/114 |

(Continued)

FOREIGN PATENT DOCUMENTS

| EP | 1724441 A2 | 11/2006 |
| EP | 2505789 A1 | 3/2012 |

(Continued)

OTHER PUBLICATIONS

European Search Report from corresponding Belgium Application No. BE 201705049, dated Oct. 18, 2017.

(Continued)

*Primary Examiner* — Igor Kershteyn
*Assistant Examiner* — Juan G Flores
(74) *Attorney, Agent, or Firm* — Sandberg Phoenix & von Gontard P.C.

(57) ABSTRACT

An assembly for a turbojet, wherein the assembly includes an outer shroud and an inner shroud that are concentric, wherein the inner shroud is segmented and includes circumferential clearances between the segments thereof. The assembly additionally includes an annular row of stator vanes connecting the inner shroud to the outer shroud, a drive with a reduction ratio that is intended to be coupled to a fan, and a circuit for cooling and for lubricating the drive. The circuit is configured to heat up at least the outer shroud during the operation of the turbine engine such as to circumferentially reduce the circumferential clearances between the segments.

20 Claims, 4 Drawing Sheets

(51) Int. Cl.
   *F01D 25/02* (2006.01)
   *F01D 9/04* (2006.01)
   *F01D 11/02* (2006.01)
   *F01D 5/14* (2006.01)
   *F01D 11/00* (2006.01)
   *F01D 15/12* (2006.01)
   *F01D 11/24* (2006.01)
   *F02C 7/14* (2006.01)
   *F02C 7/06* (2006.01)
   *F01D 25/14* (2006.01)
   *F02C 7/047* (2006.01)
   *F01D 25/10* (2006.01)
   *F01D 25/16* (2006.01)
   *F04D 29/54* (2006.01)

(52) U.S. Cl.
   CPC .......... *F01D 11/005* (2013.01); *F01D 11/025* (2013.01); *F01D 11/24* (2013.01); *F01D 15/12* (2013.01); *F01D 25/02* (2013.01); *F01D 25/10* (2013.01); *F01D 25/14* (2013.01); *F01D 25/162* (2013.01); *F01D 25/246* (2013.01); *F02C 7/047* (2013.01); *F02C 7/06* (2013.01); *F02C 7/14* (2013.01); *F04D 29/542* (2013.01); *F05D 2220/323* (2013.01); *F05D 2240/11* (2013.01); *F05D 2240/14* (2013.01); *F05D 2260/30* (2013.01); *F05D 2260/40311* (2013.01); *F05D 2300/40* (2013.01); *F05D 2300/505* (2013.01); *F05D 2300/5021* (2013.01); *F05D 2300/50212* (2013.01); *F05D 2300/603* (2013.01); *Y02T 50/672* (2013.01); *Y02T 50/675* (2013.01)

(56) References Cited

U.S. PATENT DOCUMENTS

| | | | |
|---|---|---|---|
| 8,205,426 B2* | 6/2012 | Schilling | F01D 25/14 244/134 R |
| 2003/0044282 A1 | 3/2003 | Zhu et al. | |
| 2009/0165995 A1* | 7/2009 | Bajusz | F01D 25/02 165/51 |
| 2012/0051921 A1 | 3/2012 | Reno | |
| 2013/0004315 A1 | 1/2013 | Beeck et al. | |
| 2014/0037442 A1 | 2/2014 | Tatman et al. | |

FOREIGN PATENT DOCUMENTS

| | | | | |
|---|---|---|---|---|
| EP | 2808491 A1 | | 3/2014 | |
| EP | 2808491 A1 | * | 12/2014 | ............. F01D 9/041 |
| EP | 3018295 A1 | | 5/2016 | |
| EP | 3043028 A1 | | 7/2016 | |
| FR | 2629867 A1 | | 10/1989 | |

OTHER PUBLICATIONS

European Search Report from corresponding European Application No. EP 15200715, dated Jun. 2, 2016.

* cited by examiner

COMPRESSOR WITH SEGMENTED INNER SHROUD FOR AN AXIAL TURBINE ENGINE

CROSS-REFERENCE TO RELATED APPLICATIONS

This application claims the benefit, under 35 U.S.C. § 119, of BE 2017/5049 filed on Jan. 26, 2017, the disclosure of which is incorporated herein by reference in its entirety.

FIELD

The invention relates to the field of the seal of a segmented inner shroud. More precisely, the invention concerns the seal between two turbine engine inner shroud segments. The invention also relates to an axial turbine engine, particularly an airplane turbojet or an aircraft turboprop.

BACKGROUND

In a turbojet, a compressor integrally bladed rotor requires use of a two-shell external housing architecture in order to allow the stator to be mounted. Additionally, the inner shrouds must be split at an angle. Each rectifier inner shroud then has cuts or separations. These define the adjacent segments along the circumference. The separations form unwanted passages causing leaks.

The document EP 3 018 295 A1 discloses a turbojet comprising a low-pressure compressor, a gearbox and a fan. The compressor includes several rectifiers each having an annular row of stator vanes connecting an inner shroud to an outer housing made from half-shells. The half-shells, like the inner shroud, are produced from composite material. Moreover, the inner shroud is segmented and has angular gaps between the segments thereof. These same angular gaps, or slots, are closed in a sealed manner by platforms of bladed boxes furthermore forming a guide surface that is smooth on contact with the primary flow. However, this arrangement is complex and heavy. It adds heterogeneities into the rectifier as well as geometric constraints. Moreover, some leaks can remain at the interfaces with the internal platforms and even at the circumferential ends of the segments due to the gap between the knife edges, also known as circular fins, of the rotor.

SUMMARY

The aim of the invention is to solve at least one of these problems presented by the prior art. More precisely, the aim of the invention is to simplify the seal between inner shroud angular segments while retaining the aerodynamics during the operation of the turbine engine. Another aim of the invention is to propose a solution that is resistant, light, economical, reliable, easy to produce, with convenient maintenance, easy inspection and that improves the output.

An object of the invention is an assembly for an axial turbine engine, for example for a turbojet, wherein the assembly comprises an outer shroud and an inner shroud that are coaxial, the inner shroud being segmented and comprising circumferential clearances between the segments thereof; an annular row of blades connecting the inner shroud to the outer shroud; a reduction ratio drive intended to be coupled to a fan; wherein the assembly further comprises a cooling circuit for the drive, wherein the circuit is configured to heat up at least the outer shroud during the operation of the turbine engine such as to circumferentially reduce the circumferential clearances between the segments.

According to various advantageous embodiments, the assembly can comprise one or more of the following features, taken separately or in all possible technical combinations:
- The assembly comprises a circular splitter to which the outer shroud is fixed, the cooling circuit being configured to deice said splitter.
- The outer shroud comprises a composite material with an organic resin and fibres, for example carbon fibres and/or glass fibres.
- At least one or more blades are metal and/or are shape memory blades.
- The cooling circuit is configured to heat up the blades.
- The cooling circuit comprises a heat exchanger, for example in thermal contact with the blades and/or with the outer shroud.
- At least one or each circumferential clearance generally forms an inclined straight line in space with respect to the axis of revolution of the shrouds and/or of rotation of the turbine engine according to two angles.
- The inner shroud has an external annular surface with a varying diameter.
- The blades have a radial height variation from upstream to downstream.
- The inner shroud surrounds the drive.
- The blades are produced from a material that is different to the outer shroud.
- The blades have a coefficient of expansion that is greater than the coefficient of expansion of the outer shroud.
- The drive is a reduction gear, for example an epicyclic reduction gear.
- The cooling circuit is a circuit for lubricating the drive and comprises oil flowing from the drive to the outer shroud and/or to the inner shroud.
- The shroud comprises at least: two, four, eight segments and clearances forming an alternating sequence.
- The clearances separate circumferentially the segments from each other.

Another object of the invention is a turbojet, for example a dual flow jet engine, comprising an assembly, characterized in that the assembly is in accordance with the invention, the turbojet for example comprising a fan and a compressor.

According to various advantageous embodiments, the turbojet can comprise one or more of the following features, taken separately or in all possible technical combinations:
- The turbojet comprises a housing supporting the fan and the outer shroud, the drive being in various instances placed in said housing.
- The drive is a gear reduction suitable for reducing a fan rotation speed with respect to a first shaft, for example a turbine shaft.
- The drive is suitable for increasing the rotation speed of the compressor with respect to a first shaft.
- The drive is coupled to the fan and to the compressor, the rotation speed of the compressor being greater than the rotation speed of the fan.
- The inner shroud and the outer shroud define, therebetween, the inlet of the compressor.
- The turbojet has a bypass ratio greater than or equal to: 5, or 10, or 15.
- The compressor is a low-pressure compressor.

Another object of the invention is a method for control of circumferential clearances between turbojet inner shroud segments, the turbojet comprising an assembly which includes: a reduction ratio drive driving a fan, an inner shroud segmented by a circumferential clearances, an outer shroud and an annular row of blades connecting the inner shroud to the outer shroud, the method comprising a step (a) for operation of the turbine engine, and a step (b) for heat exchange, wherein the turbine engine also comprises a circuit for heat exchange with the drive, the outer shroud and/or the blades; during the step (b) for heat exchange, the circuit makes it possible to reduce the circumferential clearances between the inner shroud segments. In various instances, the assembly can be in accordance with the assembly described above, and/or in accordance with the turbojet described above.

According to an various advantageous embodiments, during the step (b) for heat exchange, the circumferential clearances are closed; for example by expansion and/or by a change in shape of a shape memory material; the segments, in various instances, touching one another along the circumference.

According to various advantageous embodiments, the method further comprises a step (c) for stopping the turbojet, the circumferential clearances being open to a greater extent during the stopping step (c) than during the step (b) for heat exchange.

According to various advantageous embodiments, during the step (b) for heat exchange the circumferential width of the circumferential clearances is modified, and/or the radial height and/or the axial length thereof remains the same.

Generally, the advantageous modes of each object of the invention can also be applied to the other objects of the invention. Each object of the invention can be combined with the other objects, and the objects of the invention can also be combined with the embodiments of the description, which, moreover, can be combined with each other, according to all possible technical combinations.

Thermally coupling the outer shroud to the drive makes it possible to thermally slave it to the mechanical forces provided by the fan. Once the fan has provided a large mechanical effort, the expansion of the outer shroud and of the blades makes it possible to more rapidly deform the inner shroud, and therefore to close the clearances between the segments thereof. Since the seal is improved, the performance becomes optimal once the power of the fan increases. The response time is reduced, for example depending on the operating mode.

Therefore, the invention provides an intelligent assembly in that the clearances are closed—automatically—by the stresses of the turbojet. The output is optimized when the operation becomes demanding and critical, in spite of the expansion stress between the stop configuration and the operation configuration. The output can be optimized for take-off and for cruise flight.

DRAWINGS

DETAILED DESCRIPTION

It will have been clearly understood that in various embodiments the invention proposes a turbojet with a fan driven by a drive forming a hot source, the calories of which affect, via a cooling and/or lubricating circuit, the size of the circumferential clearances between segments of an inner shroud which is attached to stator vanes.

In the following description, the terms "internal" and "external" refer to a positioning with respect to the axis of rotation of an axial turbine engine. The axial direction corresponds to the direction along the axis of rotation of the turbine engine. The radial direction is perpendicular to the axis of rotation. Upstream and downstream refer to the main streaming direction of the flow in the turbine engine.

Figure 1:
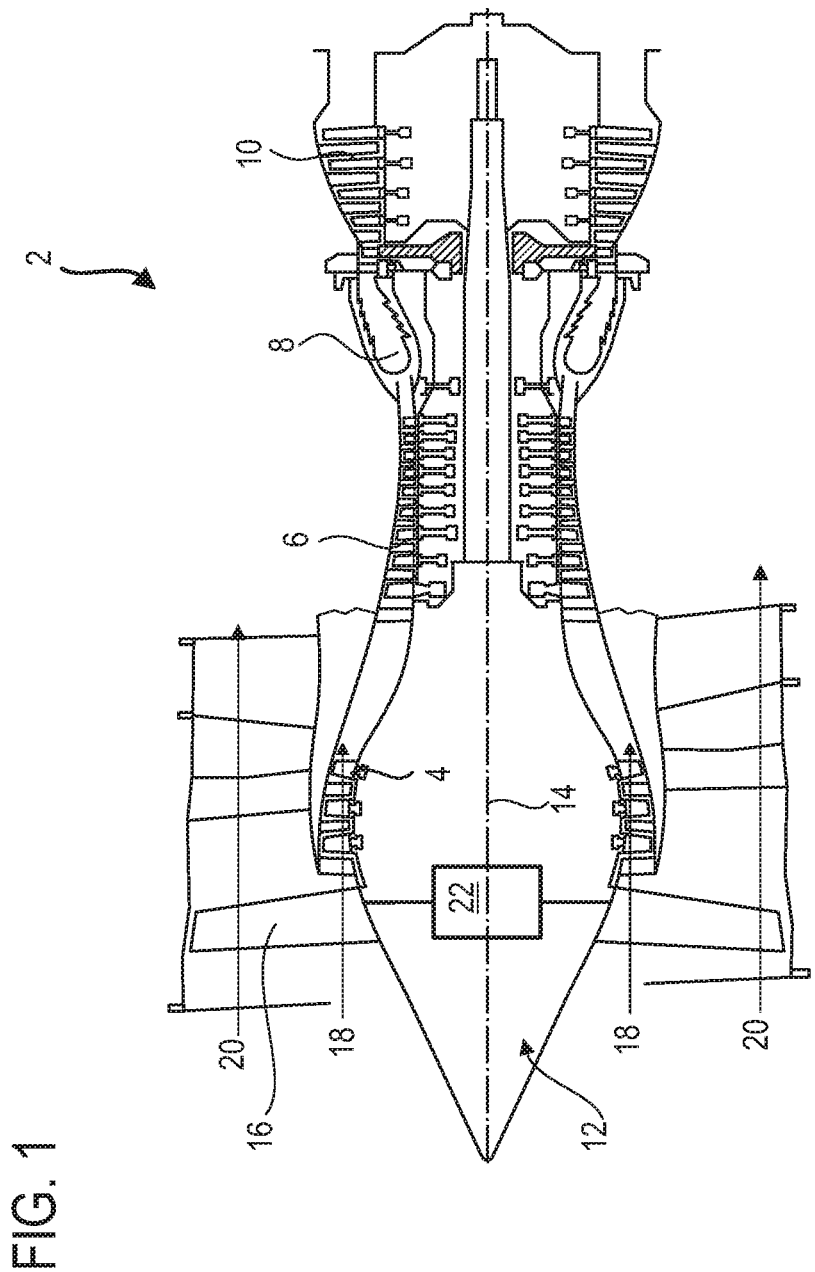
FIG. 1 shows an axial turbine engine according to various embodiments of the invention.

FIG. 1 exemplarily illustrates, in a simplified manner, an axial turbine engine 2. In this specific case, it is a dual flow turbo jet engine. The turbo jet engine generally comprises a first level of compression, called a low-pressure compressor 4, a second level of compression, called a high-pressure compressor 6, a combustion chamber 8 and one or more levels of turbines 10.

In operation, the mechanical power of the turbine 10 transmitted via the central shaft to the rotor 12 moves the two compressors 4 and 6. The latter include several rows of rotor blades associated with rows of stator vanes. The rotation of the rotor 12 around the axis of rotation 14 thereof thus makes it possible to generate a throughput of air and to progressively compress the latter up to the inlet of the combustion chamber 8.

An intake ventilator commonly called a fan 16 is coupled to the rotor 12 and generates an air flow which is divided into a primary flow 18 passing through the various aforementioned levels of the turbine engine, and into a bypass flow 20 passing through an annular duct (partially shown) along the engine to then re-join the primary flow at the turbine outlet. The fan can be of the unducted type, for example with a counterrotating double rotor, in various instances downstream.

The bypass flow can be accelerated such as to generate a thrust reaction that can be used for the flight of an aircraft. By way of example, the turbojet can have a bypass ratio of 12, wherein this ratio can correspond, in flight, to the cold flow air mass divided by the hot flow air mass.

A drive 22 forming a demultiplication with a reduction ratio, such as an epicyclic reduction gear, can reduce the rotation speed of the fan with respect to the associated turbine.

Figure 2:
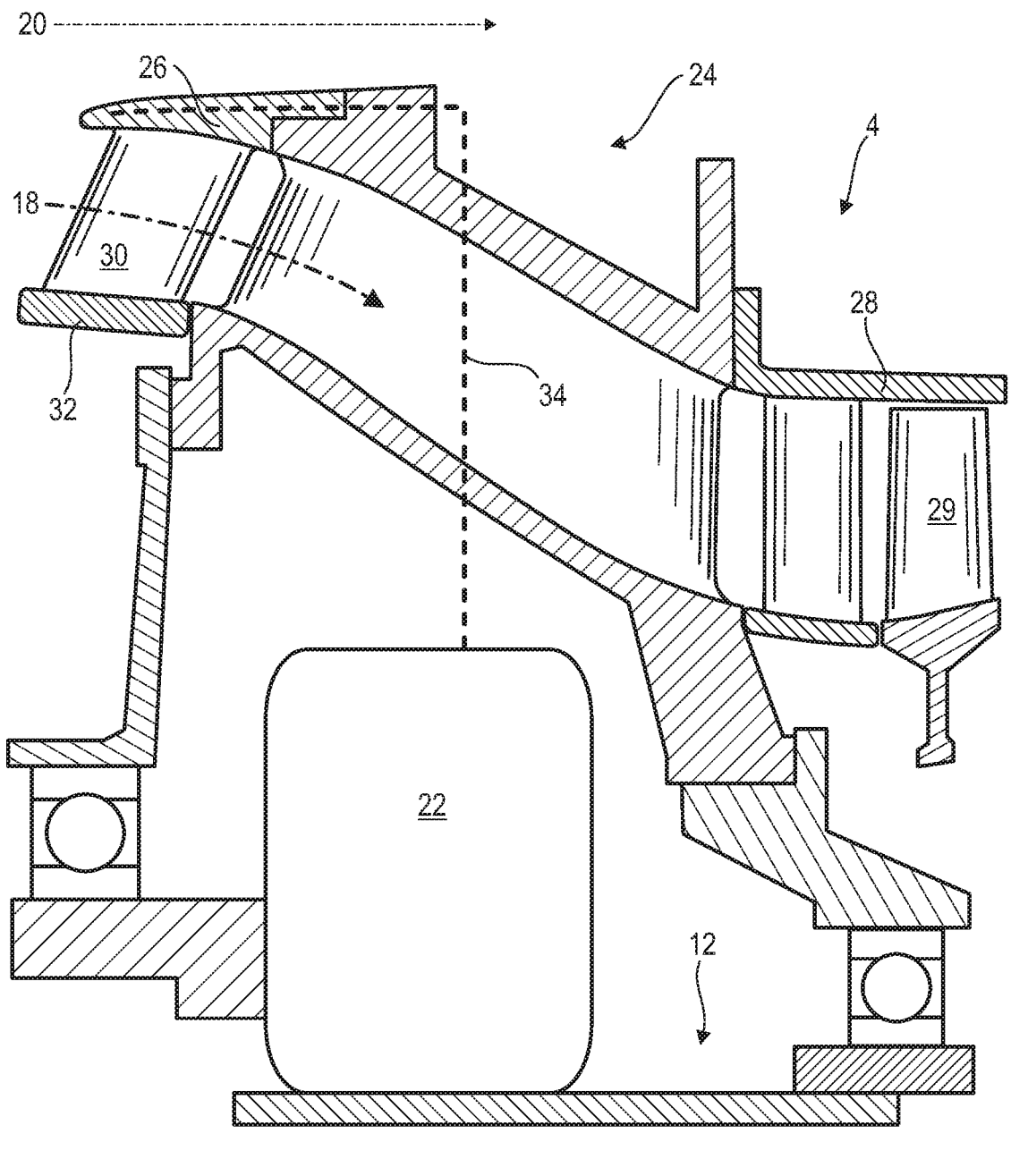
FIG. 2 is a diagram of a turbine engine assembly according to various embodiments of the invention.

FIG. 2 is an exemplary sectional view of a turbine engine rotor 12 support housing 24, wherein the turbine engine can be similar to that of FIG. 1. It is possible to see, therein, part of the low-pressure compressor 4, the drive 22, and a splitter 26 for the primary flow 18 and for the bypass flow 20.

The low-pressure compressor can generally correspond to that described in the document EP 3 018 295 A1, the support housing 24 then being placed between the external housing 28 of the compressor and the splitter 26. The rotor blades 29 of the rotor 12 of the compressor can be surrounded by the external housing 28. The rotor 12, or at least one of the rows of blades 29 thereof can form an integrally bladed disc or an integrally bladed drum.

The drive 22 can be coupled to the low-pressure turbine. It can make it possible to reduce the rotation speed of the fan with respect to that of the low-pressure turbine. The speed of the compressor 4 can be greater than that of the fan, and optionally of the low-pressure turbine, due to a drive with a double epicyclic gear train, in various instances with a double output.

The support housing 24 forms the structure, the frame of the turbine engine. It is designed to support the thrust force of the fan, in addition to being able to carry the dead weight of the turbine engine. It can be referred to by the acronym FHF, meaning "Fan Hub Frame". It can be an intermediate housing. The drive 22 can be fixed to the support housing 24. The support housing can be a fan hub frame and or an intermediate casing. It can be housed at least partially in a chamber provided in the housing 24.

The splitter 26 includes an annular row of stator vanes 30, also referred to herein as blades, making it possible to suspend, therefrom, the inner shroud 32 which is, moreover, segmented. The inner shroud 32 is, thus, divided into several segments spread over a circle. The segments can be angular segments and/or angular segments. These segments are separated according to circumferential clearances (not visible), also called angular clearances. These clearances are distributed about the axis of rotation 14. When stopped, the inner shroud segments are spaced from each other, e.g., they can be free of contact with one another. During operation, the segments move closer together, in various instances until they touch one another at the ends thereof along the circumference.

The inner shroud 32 can surround the drive 22, and/or axially be at a distance therefrom. The latter can be associated with a cooling circuit 34. This circuit 34 can comprise a liquid coolant, for example oil which makes it possible to cool and evacuate at least 50 kW during operation. By using oil, the circuit 34 can become a lubricating circuit, giving it a second function.

The cooling circuit 34 thermally cooperates with the splitter 26. It can heat it up in order to counteract the formation of ice thereon on contact with the flows 18 and 20. Consequently, the splitter 26 becomes a heat exchanger that can be used for cooling the circuit 34. This heat exchange makes it possible to deform the splitter 26. The deformation can occur at an outer shroud, and/or at the stator vanes 30 and/or at the inner shroud 32. The deformation can result from an expansion and/or from a change in configuration of a shape memory material used to produce the internal and outer shrouds as well as the stator vanes 30.

Figure 3:
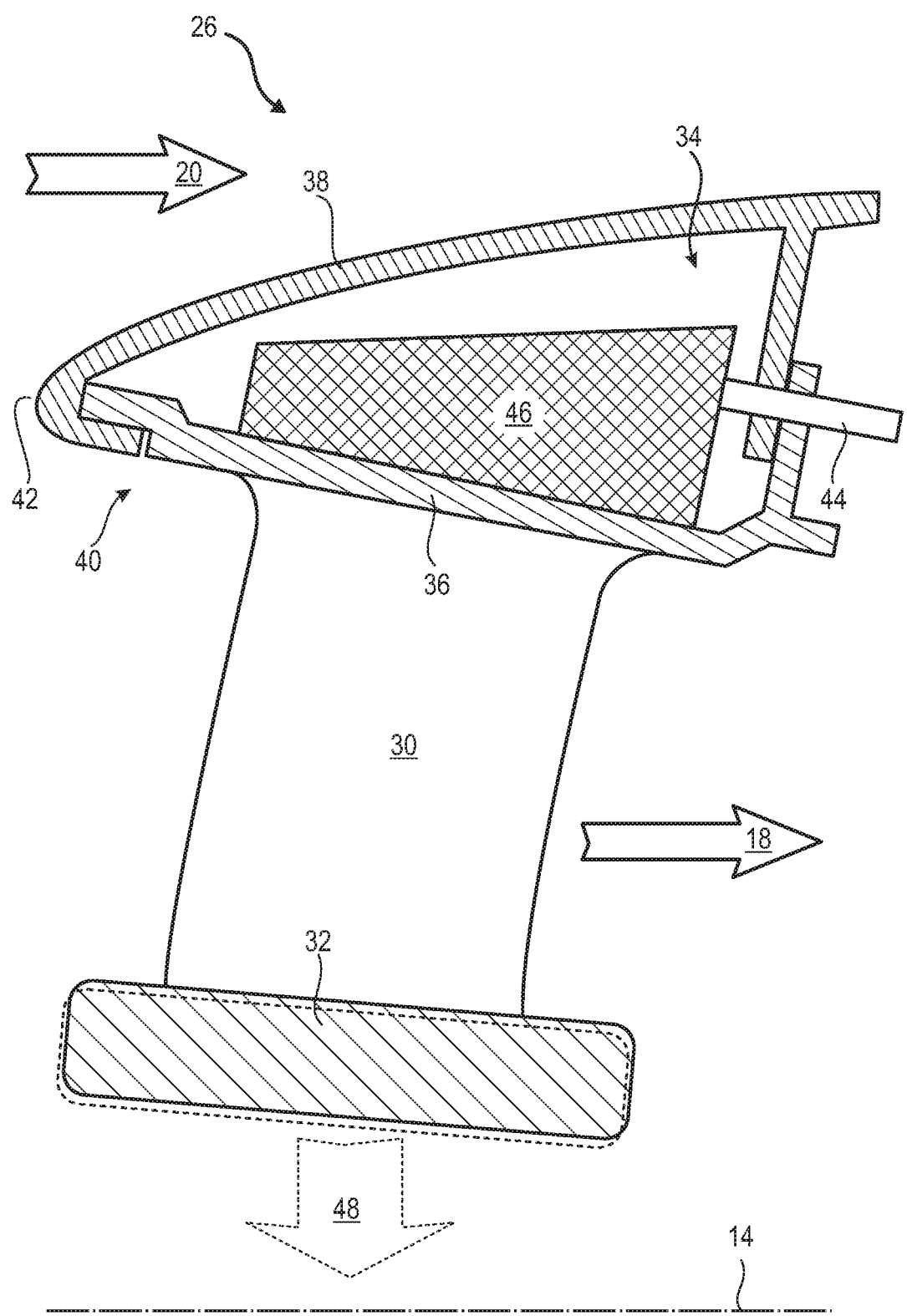
FIG. 3 illustrates an enlargement of part of the assembly of FIG. 2 according to the invention.

FIG. 3 is an enlargement of a part of FIG. 2. The inner shroud 32 is shown in solid line in a first position, for example when the turbine engine has stopped, and in dotted line in a second position, for example when the turbine engine operates and the splitter 26 deforms internally. The deformation can comprise a change in diameter.

The splitter 26 includes an outer shroud 36 fixed to an annular external wall 38. The fixing interface thereof can be an annular hook 40. A circular splitting edge 42 can be formed upstream, therefore on the external wall 38. This splitting edge 42 forms the circular separating line between the primary flow 18 and the bypass flow 20. The stator vanes 30 extend radially inwards from the outer shroud 36.

The outer shroud 36 and/or the stator vanes 30 are produced from metal materials. Alternatively or optionally, the outer shroud 36 and/or the blades 30 are produced from shape memory materials. The outer shroud 36 can be made from an organic matrix and carbon fibre composite material in order to lighten it and reduce the coefficient of expansion thereof, in various instances the blades can be metal. The stator vanes 30 can comprise a coefficient of expansion of at least: $10^{(-6)}$, or $2.501*10^{(-5)}$ $K^{(-1)}$.

The radial height of the jet of the primary flow 18 can vary axially. Thus, the deformation driven by the blades 30 can become complex such that each segment tilts along an axis perpendicular to the axis of rotation 14, in addition to a radial displacement 48.

The splitter 26 partially houses the cooling circuit 34 which can include a pipe 44 and a heat exchanger 46. The latter can be in thermal contact with the stator vanes 30 and/or the outer shroud 36, for example when the stator vanes 30 pass through the outer shroud 36. As a result, the circuit 34 is able to provide calories to the blades. In response, the shroud and/or the blades can be deformed, for example expand. In various alternative instances, they can change state when they are produced from shape memory material.

The circuit 34 can extend inside the blades 30 and/or the inner shroud 32, and therefore into the segments thereof. Thus, the calories exchanged with the circuit 34 can lead to a deformation of the blades 30 and/or of the inner shroud 32 segments. The deformations can be localized. They can be expansions and/or changes in the shape of the shape memory material of the blades and/or of the segments.

Figure 4:
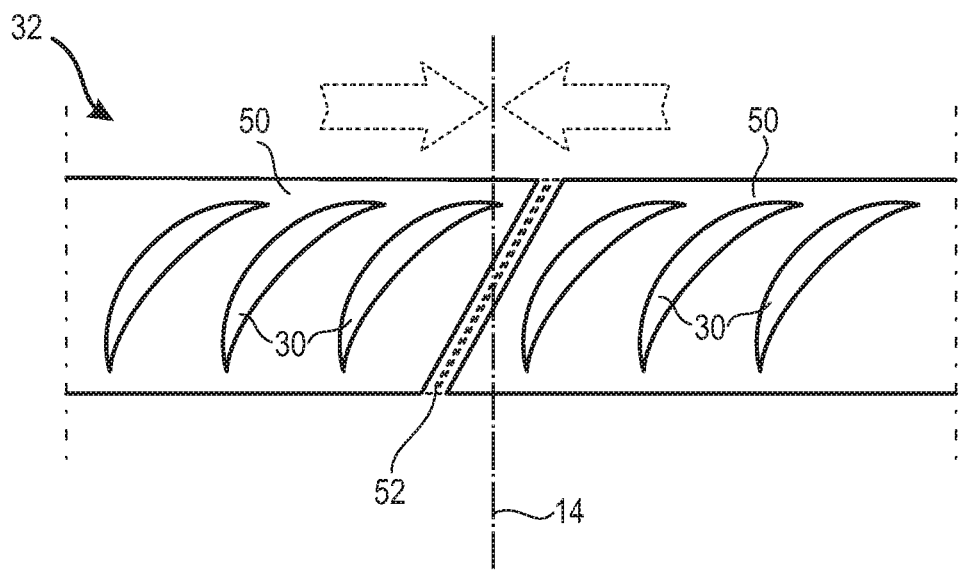
FIG. 4 shows two adjacent segments of the assembly according to various embodiments of the invention.

FIG. 4 shows two inner shroud 32 segments 50 separated by a circumferential clearance 52, for example inclined with respect to the axis of rotation 14. The segments 50 and the clearance 52 are representative of the entire shroud, where the clearances and the segments form an alternating sequence. The segments and the clearances can correspond to those described in relation to FIG. 3. Again, the shroud segments 50 are shown in solid line in the first position, and in dotted line in the second position.

Between the first and the second position, the segments 50 move closer together; more precisely, the ends 54 thereof along the circumference move closer together. In various instances, these ends 54 can touch one another. As a result of coming closer together, into contact, respectively, each circumferential clearance 52 can close, and in various instances become sealed. As a result, the leaks which would have been able to rush therein are blocked. A gain in output is permitted since the increase in pressure produced through the stator vanes 30 increases.

The closure of the circumferential clearances 52 can in various instances result from a circumferential elongation of the segments 50, or from the deformation thereof. The reduction of the clearances 52 can follow a change in configuration of blades 30 circumferentially pushing the segments 50, the blades 30 then becoming actuators. Alternatively, this can be caused by a modification of the curvature of the segments. During the deformation, the inner shroud can retain a constant diameter.

Figure 5:
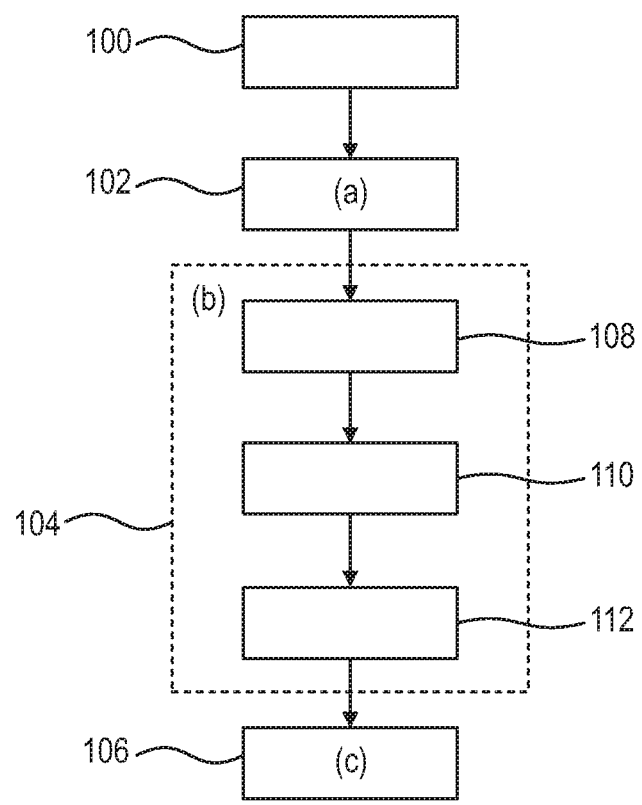
FIG. 5 is a diagram of the method for control of circumferential clearances between turbojet inner shroud segments according to various embodiments of the invention.

FIG. 5 is a diagram of a method for control of circumferential clearances between turbojet inner shroud segments. The turbojet can correspond to that described by FIGS. 1-4.

The method can comprise the following steps:
  starting 100;
  (a) operation 102 of the turbine engine;
  (b) heat exchange 104 between the cooling circuit and at least one of the elements chosen from the blades, the inner shroud, and the outer shroud; then
  (c) stopping the turbojet 106, wherein the circumferential clearances are open to a greater extent than during the step (b) for heat exchange 104.

During the step (b) for heat exchange 104, the circumferential clearances between the inner shroud segments decrease, and in various instances close in a sealed manner. As a reminder, this can be produced by expansion and/or by a change in shape of a shape memory material, or by deformation forced by an element of the splitter. This also applies to the segments of the inner shroud, the blades or the outer shroud.

The step (b) for heat exchange 104 can be broken down into at least three stages, including a parking stage 108, a take-off stage 110, and a cruise flight stage 112. These stages can correspond to progressive modes of an aircraft. Of course, during the step (b) for heat exchange 104, the step (a) for operation 102 continues to take place. These steps can therefore overlap. According to the invention, the clearances can remain in the first position during the parking stage 108, and in a second position during the take-off stage 110 and/or during the cruise flight stage 112. This makes it possible to choose the appropriate time to close the clearances, and therefore to obtain the maximum output in spite of the existence of several thermal configurations.

What is claimed is:

1. An assembly for an axial turbine engine, said assembly comprising:
    an outer shroud and an inner shroud that are coaxial, the inner shroud comprising segments and circumferential clearances between the segments thereof;
    an annular row of stator vanes connecting the inner shroud to the outer shroud;
    a reduction ratio drive intended to be coupled to a fan; and
    a cooling circuit for the reduction ratio drive, which cooling circuit is configured to heat up the outer shroud during the operation of the axial turbine engine such as to circumferentially reduce the circumferential clearances between the segments.

2. The assembly according to claim 1 further comprising a circular splitter to which the outer shroud is fixed and surrounding the outer shroud, the cooling circuit being structurally and functionally configured to deice said circular splitter.

3. The assembly according to claim 1, wherein the outer shroud comprises a composite material with an organic resin and fibres, the fibres including carbon fibres and/or glass fibres.

4. The assembly according to claim 1, wherein at least one stator vane of the annular row of stator vanes includes metal and/or a shape memory material.

5. The assembly according to claim 1, wherein the cooling circuit is structurally and functionally configured to heat up the stator vanes in order to deice the stator vanes.

6. The assembly according to claim 1, wherein the cooling circuit comprises a heat exchanger in thermal contact with at least one stator vane of the annular row of stator vanes and/or in thermal contact with the outer shroud in order to deice the at least one stator vane and/or the outer shroud.

7. The assembly according to claim 1, wherein at least one circumferential clearance of the circumferential clearances forms an inclined straight line in space with respect to an axis of rotation of the axial turbine engine, wherein the axis of rotation and the inclined straight line are not co-planar.

8. The assembly according to claim 1, wherein the inner shroud has an external annular surface with an outer diameter variation along an axial direction.

9. The assembly according to claim 1, wherein the stator vanes have a radial height variation from upstream to downstream.

10. The assembly according to claim 1, wherein the inner shroud surrounds the reduction ratio drive.

11. A turbojet engine, said engine comprising:
    a fan;
    a compressor; and
    an assembly, wherein the assembly comprises:
        an outer shroud and an inner shroud that are coaxial, the inner shroud comprising segments and circumferential clearances between the segments thereof;
        an annular row of stator vanes connecting the inner shroud to the outer shroud;
        a reduction ratio drive for driving the fan;
        a cooling circuit for the reduction ratio drive, wherein the cooling circuit is configured to heat up the outer shroud during the operation of the turbine engine so as to circumferentially modify the circumferential clearances between the segments.

12. The turbojet engine according to claim 11 further comprising a fan hub frame supporting the fan and the outer shroud, the reduction ratio drive being placed in the fan hub frame.

13. The turbojet engine according to claim 11, wherein the reduction ratio drive is a gear reduction suitable for reducing a fan rotation speed with respect to a first shaft.

14. The turbojet engine according to claim 11, wherein the reduction ratio drive is suitable for increasing a rotation speed of the compressor with respect to a turbine shaft.

15. The turbojet engine according to claim 11, wherein the fan and the compressor rotate at a respective rotation speed, wherein the reduction ratio drive is coupled to the fan and to the compressor, and wherein the rotation speed of the compressor is greater than the rotation speed of the fan.

16. The turbojet engine according to claim 11, wherein the inner shroud and the outer shroud define therebetween an inlet of the compressor.

17. The turbojet engine according to claim 11, wherein the turbojet engine has a bypass ratio greater than or equal to at least one of 5, or 8, or 12, or 15.

18. A method for controlling circumferential clearances between turbojet engine inner shroud segments, the turbojet engine comprising an assembly that includes a reduction ratio drive driving a fan, an inner shroud segmented by circumferential clearances, an outer shroud, and an annular row of stator vanes connecting the inner shroud to the outer shroud, the method comprising the following steps:
    operating the turbojet engine, and
    exchanging heat, wherein the turbojet engine also comprises a circuit for heat exchange with two or three of:
        the reduction ratio drive,
        the outer shroud or,
        the stator vanes;
    wherein during the step for exchanging heat, the circuit reducing the circumferential clearances between the inner shroud segments.

19. The method according to claim 18, wherein during the step of exchanging heat, the circumferential clearances are closed by a change in shape of a shape memory material, the inner shroud segments touching one another along the circumference.

20. The method according to claim 18 further comprising a step of stopping the turbojet engine, the circumferential clearances being open to a greater extent during the stopping step than during the step for heat exchange.

* * * * *